Figure 1:
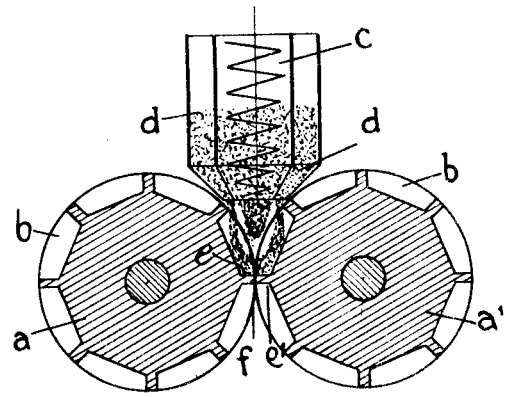

C. SCHNEIDER.
BRIQUET.
APPLICATION FILED JULY 9, 1914.

1,132,527.

Patented Mar. 16, 1915.

UNITED STATES PATENT OFFICE.

CARL SCHNEIDER, OF PLAU, GERMANY.

BRIQUET.

1,132,527.

Specification of Letters Patent.

Patented Mar. 16, 1915.

Application filed July 9, 1914. Serial No. 849,953.

*To all whom it may concern:*

Be it known that I, CARL SCHNEIDER, engineer, a subject of the Grand Duke of Mecklenbourg-Schwerin, in Germany, residing in Plau, in Grand Duchy of Mecklenbourg-Schwerin, and whose post-office address is Plau, have invented certain new and useful Improvements in Briquets; and I do hereby declare the following to be a full, clear, and exact description of the invention, such as will enable others skilled in the art to which it appertains to make and use the same, reference being had to the accompanying drawings, and to letters or figures of reference marked thereon which form a part of this specification.

In briqueting by the semi-dry process it will occur that the compressed bodies, the briquets, stick to the mold and are broken when being removed from the latter. Besides the ventilation is not satisfactory with the customary briqueting process. In briqueting a compound of cement and straw these advantages are obviated by the hereinafter described briqueting process, which has, besides, further advantages for this special raw material.

For the burning of cement it has been found to be of advantage to embed the fuel in the briquets. In such cases it will easily occur that the material sinters before the fuel contained in the core has been burnt. Furthermore it is very difficult to set the fuel afire and much fuel has to be used. These disadvantages may be obviated if the briquets are made of a cement raw compound and disintegrated fuel in such a manner, that the fuel is contained in the outer layer only. This allows of producing a homogenous cement clinker in which the raw material has thoroughly caked, while the fuel is contained in the outer shell of the bricks produced, and does not penetrate into the core.

In employing this process only a part of the raw material is mixed with coarse or pulverulent fuel, which is added in considerable quantity. The briquets are then pressed so that their core is composed of a material free from fuel, their outside being of a material rich in fuel. This may be obtained by aid of known auxiliary mechanisms.

According to the present invention instead of material of just the proper degree of moisture a material which is very moist and in socalled pressing condition on the one hand, and a dry ground material on the other hand are employed. A lump is formed of the thickly plastic cement raw material which has been thoroughly mixed in a brick-making machine or a similar kneading machine. This lump is then enveloped with a dry substance and thus compressed to the required briquet. The surplus moisture contained in the core is thereby driven outward into the dry substance, so that the briquet is wetted through and through and well cemented together. At the same time the air will be expelled from the dry powder. The result is a sound, dense briquet free from air-blisters and of a homogenous structure.

The new process may be performed by hand or mechanically. By such dry briqueting briquets are obtained which afford the same advantages as those hitherto produced by wet briqueting process. The latter has, however, been abandoned in cement industry, owing to the necessary drying it requires. The hitherto employed dry briqueting processes had the disadvantage that the briquets produced would readily break and fall to pieces in the kiln. The combination of the two processes according to the present invention allows of omitting the drying and of transferring the briquets immediately into the kiln. It furthermore produces briquets which are as sound, strong, homogenous and free from air as those hitherto obtained by the wet process.

A modification of the briqueting process described consists in making box-like shells by preliminarily compressing pulverulent cement raw compound, which box-shaped shells, when placed on each other form a briquet with a large cavity. The dry material will always still contain sufficient moisture to allow of such briqueting. The wet lump of material is then placed between such shells whereupon the whole is combined by briqueting in the hereinbefore described manner.

A further improvement of briquets containing fuel consists in a coal containing mixture being pressed on one side of the briquet only, instead of on all sides. With the ordinary bricks of a parallele-pipedal shape it is generally sufficient to provide only one of the bearing faces with such fuel-material. Only when the briquets have numerous small surfaces will it be advisable to provide two of the same with such fuel-material. This modification is particularly suitable for making briquets of standard shape. In such case the usual presses may be used for making the raw bricks. The fuel-material will adhere very securely to the level surface and is not sensitive to blows.

The raw briquets produced according to the present invention show a very favorable behavior in burning. They will burn readily and thoroughly; will not retain any remnants of fuel, and the clinkers produced are therefore very pure. They quickly condense, the cement does not discolor and fuel is saved.

For performing the present process by mechanical means, single-acting die, toggle or screw presses may be employed. For economic continuous working, arrangements are employed which essentially consist of a pair of briqueting rollers of the known type, having the corresponding recesses in their surfaces, the rollers being intermittently revolved. Between these rollers a mixing press feeds a wet lump of material with or without fuel, while from silos arranged next to the said press dry, pulverulent cement raw compound, mixed if desirable with coarse or pulverulent fuel, is supplied in such a manner that the powder leads slightly ahead of the wet material. With the modified process special dies first press the shells from dry material into the rollers, whereupon the wet lump is embedded in such shells, on the rollers approaching shortly before the final pressure.

In the accompanying drawing the designs which have been found by the applicant are shown in diagram.

Figure 2:
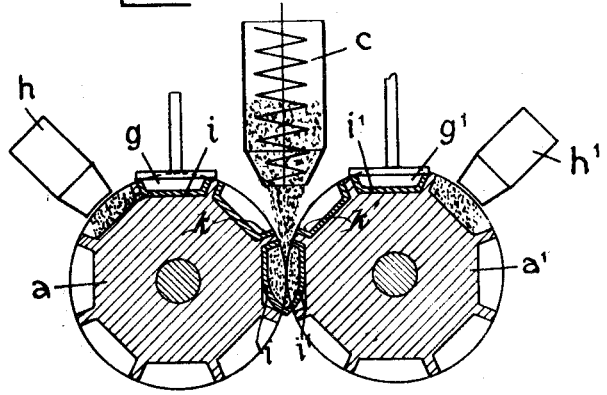

Figure 1 is a cross section through a pair of rollers with separate feeds for the dry and the wet materials respectively. Fig. 2 is a cross section through the arrangement for pressing the shells.

The rollers $a$ and $a^1$ are provided with forms or mold recesses $b$ in them. They are intermittently driven in known manner, so that at the entrance side of the rollers the forms close to form whole molds. In Fig. 1 a press $c$ for wet material and two spouts $d$ and $d^1$ form silos for dry material, if necessary mixed with fuel are shown over the entrance between the rollers. These feeds are automatically opened, as soon as the radial walls of the forms $e$ and $e^1$ meet at the middle plane, as shown at $f$. At this moment the form is closed below. First some dry material enters, and then only follows the wet lump, which is so dimensioned, that it only partly fills the cavity of the form, so that it can be enveloped all around by dry material.

In the arrangement for first pressing the shells (Fig. 2) only the press $c$ is disposed above the entrance between the rollers $a$, $a^1$. Vertically over the axes of the rollers are arranged rams $g$, $g^1$, which press the dry material, which, if necessary, is mixed with fuel, and which is supplied by the feeds $h$, $h^1$ in form of shells $i$, $i^1$. As soon as the walls $k$, $k^1$ of the shells meet, the wet lump of material from the press $c$ enters between them.

The feeding gears, pressing rams and the press are operated at the given moments after known methods of mechanical engineering.

I claim:

1. A raw cement briquet having fuel combined therewith, said fuel being in the outer layer only of the briquet.

2. A raw cement briquet having an interior core of raw cement mixture and an outer layer of raw cement mixture admixed with fuel.

3. A raw cement briquet having its body portion composed of raw cement mixture and having on one face thereof a surface layer of said mixture rich in fuel.

In testimony that I claim the foregoing as my invention, I have signed my name in presence of two subscribing witnesses.

CARL SCHNEIDER.

Witnesses:
 CASPAR FREDRIK HAUSEN,
 WOLDEMAR HAUPT.